No. 889,740. PATENTED JUNE 2, 1908.
J. C. YOUNG.
STUFFING BOX.
APPLICATION FILED OCT. 14, 1907.
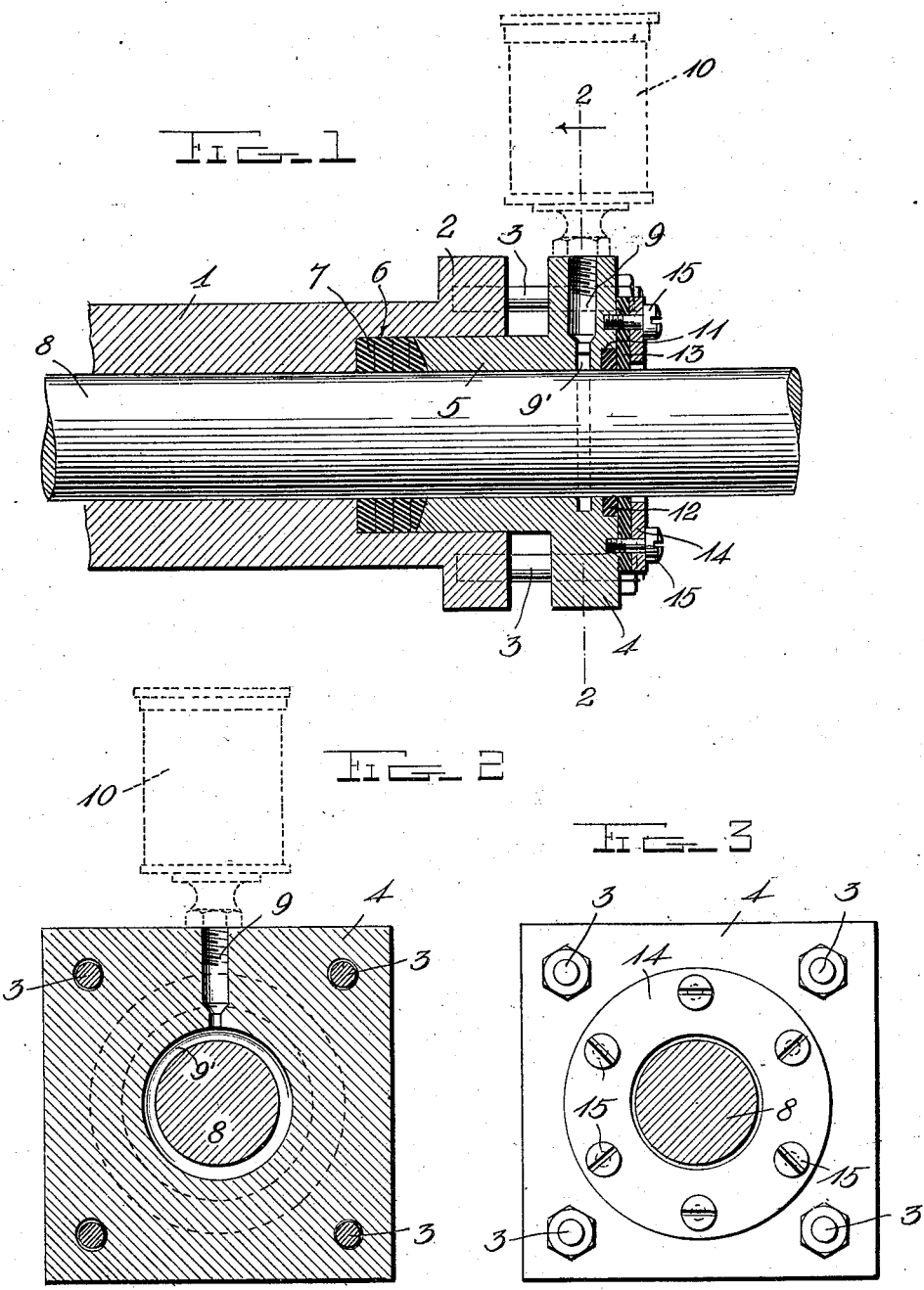
Witnesses
C. H. Griesbauer
Inventor
J. C. Young
by H. B. Willson & Co.
Attorneys

UNITED STATES PATENT OFFICE.

JOHN C. YOUNG, OF PLYMOUTH, PENNSYLVANIA.

STUFFING-BOX.

No. 889,740.　　　Specification of Letters Patent.　　　Patented June 2, 1908.

Application filed October 14, 1907. Serial No. 397,427.

*To all whom it may concern:*

Be it known that I, JOHN C. YOUNG, a citizen of the United States, residing at Plymouth, in the county of Luzerne and State of Pennsylvania, have invented certain new and useful Improvements in Stuffing-Boxes; and I do declare the following to be a full, clear, and exact description of the invention, such as will enable others skilled in the art to which it appertains to make and use the same.

This invention relates to stuffing boxes, designed especially for use in connection with pump plungers, pistons rods, and analogous reciprocating members; and has for its objects to provide a comparatively simple inexpensive device of this character through the medium of which a perfectly tight joint will be formed around the reciprocatory member; one in which the member will be properly lubricated during operation, thus to reduce friction and wear upon the member; and one wherein the lubricant will be effectively confined between the packing gaskets, which latter will wipe the member on its outstroke.

With these and other objects in view, the invention comprises the novel features of construction and combination of parts more fully hereinafter described.

In the accompanying drawings,—Figure 1 is a vertical, longitudinal sectional view taken centrally through a stuffing box embodying the invention; Fig. 2 is a vertical transverse section, taken on the line 2—2 of Fig. 1; Fig. 3 is an end elevation of the device.

Referring to the drawings, 1 designates a portion of a pump or other cylinder having an end flange 2, to which is detachably secured by fastening members or bolts 3, the flange 4 of a gland member 5, the tubular portion of which seats in a corresponding recess 6, formed in the cylinder, and confines within said recess a packing gasket 7, there being arranged to work through the cylinder 1 and gland member a plunger or other reciprocatory member 8.

The foregoing parts which are conventionally shown herein may all be of the usual or any appropriate construction and material and are adapted in practice to perform their ordinary functions.

In accordance with the present invention, there is formed vertically through the portion 4 of the gland member a lubricant passage or duct 9, discharging at its inner end into an annular groove or passage 9', and having internal threads for engagement by the stem or shank of a lubricator 10, shown by dotted lines, and which may be of any preferred construction, it being understood in this connection that the lubricant will in practice be discharged in the usual manner under pressure from the cup and through the duct 9 for lubricating the reciprocatory member 8.

Formed in the outer face of the gland member around the plunger 8 is an annular recess 11 designed to receive a packing ring or gasket 12, composed of rubber or other suitable material, there being applied to the outer face of the gland member immediately over the ring 12 a second packing ring or gasket 13, confined in place by means of a metal annulus 14, detachably secured to the face of the gland member by screws or other fastenings 15, which may be manipulated for compressing the packing rings between the members 4 and 14, thereby causing the packing to bear snugly upon the surface of the plunger 8.

In practice, the lubricant is discharged through the passage 9 into the annular duct 9', by which it is carried wholly around and distributed to the surface of the reciprocatory member 8 during its movement back and forth through the stuffing box. On the instroke of the plunger the lubricant will be carried inward in the usual manner, while upon its outstroke, the packing rings or gaskets 12 and 13, will through contact with the surface of the member, serve to effectually wipe the lubricant therefrom, thus to prevent its escape from the stuffing box, and consequent waste of the lubricant.

It is to be particularly observed that under the construction described, the lubricant is effectually confined within the stuffing box between the packing gaskets 6 and 12, where it will act for properly lubricating the member 8 to minimize friction and reduce wear on the parts.

What I claim as my invention is:

In a stuffing box, the combination with a shaft cylinder having a recess in its inner face near one end thereof, a square flange on the outer face of said recessed end, a cylindrical gland member fitting within said recess and having an annular recess in its outer end, a gasket arranged between the inner end of said gland member and the rear wall of said recess, a square flange on said gland member, bolts connecting the flanges of said cylinder and gland member, a shaft running through both, a gasket arranged in the recess of the gland member flush with the outer face thereof, a washer overlapping the gasket of the gland member and fitting the shaft, said washer overlying the flanged end of the gland member, a metal annulus clamping the gasket within the gland member by pressure upon the washer, bolts passing through the annulus and the washer to clamp the parts in position, a fluid packing chamber formed in the gland member between the separated gaskets, and an oil cup carried by said member to feed said chamber.

In testimony whereof I have hereunto set my hand in presence of two subscribing witnesses.

J. C. YOUNG.

Witnesses:
J. W. COCKRELL,
CARRIE E. FETZER.